(12) United States Patent  
Hua

(10) Patent No.: US 12,096,118 B2  
(45) Date of Patent: Sep. 17, 2024

(54) CAMERA CONTROL METHOD, DEVICE, STORAGE MEDIUM AND ELECTRONIC EQUIPMENT

(71) Applicant: REALME CHONGQING MOBILE TELECOMMUNICATIONS CORP., LTD., Chongqing (CN)

(72) Inventor: Feng Hua, Chongqing (CN)

(73) Assignee: REALME CHONGQING MOBILE TELECOMMUNICATIONS CORP., LTD., Chongqing (CN)

( * ) Notice: Subject to any disclaimer, the term of this patent is extended or adjusted under 35 U.S.C. 154(b) by 200 days.

(21) Appl. No.: 17/676,508

(22) Filed: Feb. 21, 2022

(65) Prior Publication Data

US 2022/0182546 A1  Jun. 9, 2022

Related U.S. Application Data

(63) Continuation of application No. PCT/CN2020/113057, filed on Sep. 2, 2020.

(30) Foreign Application Priority Data

Sep. 3, 2019 (CN) .......................... 201910878336.0

(51) Int. Cl.
*H04N 23/667* (2023.01)
*G06T 5/73* (2024.01)
(Continued)

(52) U.S. Cl.
CPC ............. *H04N 23/667* (2023.01); *G06T 5/73* (2024.01); *H04N 23/45* (2023.01); *H04N 23/63* (2023.01);
(Continued)

(58) Field of Classification Search
CPC ...... H04N 23/667; H04N 23/80; H04N 23/67; H04N 23/45; G06T 5/003
(Continued)

(56) References Cited

U.S. PATENT DOCUMENTS

2008/0030592 A1  2/2008  Border et al.
2012/0050458 A1  3/2012  Mauchly
2018/0295292 A1* 10/2018  Lee .................... H04N 23/67

FOREIGN PATENT DOCUMENTS

CN          104980644 A       10/2015
CN          105959553 A        9/2016
(Continued)

OTHER PUBLICATIONS

International Search Report and the Written Opinion Dated Nov. 20, 2020 From the International Searching Authority Re. Application No. PCT/CN2020/113057, 12 pages.
(Continued)

*Primary Examiner* — Joel W Fosselman
(74) *Attorney, Agent, or Firm* — BAYES PLLC

(57) ABSTRACT

The present disclosure discloses a camera control method, a device, a storage medium and an electronic equipment includes: detecting a change trend of a focus distance of a first camera operating in the foreground, determining a second camera corresponding to the change trend of the focus distance, activating the second camera in the background, and switching the second camera to operate in the foreground when the real-time focus distance of the first camera is within a focus distance interval of the second camera.

20 Claims, 5 Drawing Sheets

(51) Int. Cl.
  *H04N 23/45* (2023.01)
  *H04N 23/63* (2023.01)
  *H04N 23/67* (2023.01)
  *H04N 23/80* (2023.01)
(52) U.S. Cl.
  CPC ............ *H04N 23/67* (2023.01); *H04N 23/80* (2023.01); *G06T 2207/20201* (2013.01)
(58) Field of Classification Search
  USPC ........................................................ 348/241
  See application file for complete search history.

(56) References Cited

FOREIGN PATENT DOCUMENTS

| | | |
|---|---|---|
| CN | 106197382 A | 12/2016 |
| CN | 106303227 A | 1/2017 |
| CN | 106791378 A | 5/2017 |
| CN | 107343190 A | 11/2017 |
| CN | 108769485 A | 11/2018 |
| CN | 110351487 A | 10/2019 |
| CN | 110505389 A | 11/2019 |
| EP | 2385692 A1 | 11/2011 |
| EP | 3122021 A2 | 1/2017 |
| EP | 3328063 A1 | 5/2018 |

OTHER PUBLICATIONS

The first Office Action Date Aug. 5, 2020 from from China Application No. 201910878336.0, 20 pages.
Notice of Allowance Date Dec. 10, 2020 from from China Application No. 201910878336.0, 9 pages.
The supplementary European search report dated Sep. 6, 2022 from European patent Application No. 20860761.4.

* cited by examiner

CAMERA CONTROL METHOD, DEVICE, STORAGE MEDIUM AND ELECTRONIC EQUIPMENT

CROSS REFERENCE TO RELATED APPLICATIONS

This application is a continuation of International Application No. PCT/CN2020/113057, filed on Sep. 2, 2020, which claims priority of Chinese Patent Application No. 201910878336.0, filed on Sep. 3, 2019, the entire contents of which are incorporated herein by reference in their entireties.

FIELD OF THE DISCLOSURE

The present disclosure relates to the field of camera technology, in particular to a camera control method, a device, a storage medium and an electronic equipment.

BACKGROUND

At present, electronic equipment such as smart phones or tablet computers are usually equipped with a plurality of cameras, a user can take advantage of the characteristics of these cameras to obtain the optimal shooting effect.

For example, during the preview, the user can switch any one of a plurality of cameras to the foreground according to an actual need, preview through the foreground operating camera, and then shoot.

SUMMARY

The present disclosure comprises a camera control method, a device, a storage medium, and an electronic equipment, which can solve the problem of getting stuck in the preview image in the process of switching cameras.

In a first aspect, the present disclosure comprises a camera control method, which is applied to an electronic equipment, the electronic equipment includes a plurality of cameras with different focal lengths. The camera control method comprises: detecting a change trend of a focus distance of a first camera operating in the foreground when the first camera is operating in the shooting preview mode, and an image captured by the first camera is set as a preview image; determining a second camera corresponding to the change trend of the focus distance according to a preset correspondence relationship between the change trend of the focus distance and a camera to be determined; activating the second camera in the background; and switching the second camera to operate in the foreground when the real-time focus distance of the first camera is within a focus distance interval of the second camera, and an image captured by the second camera is set as a preview image.

In a second aspect, the present disclosure provides a camera control device, which is applied to an electronic equipment, the electronic equipment comprises a plurality of cameras with different focal lengths, and the camera control device comprises: a trend determination module, configured to detect a change trend of a focus distance of a first camera operating in the foreground when the first camera is in the shooting preview mode, and an image captured by the first camera is set as a preview image; a background determination module, configured to determine a second camera corresponding to the change trend of the focus distance according to a preset correspondence relationship between the change trend of the focus distance and a camera to be determined; a background activation module, configured to activate the second camera in the background; and a switch control module, configured to switch the operation of the second camera to the foreground when the real-time focus distance of the first camera is within a focus distance interval of the second camera, and an image captured by the second camera is set as a preview image.

In a third aspect, the present disclosure provides a storage medium on which a computer program is stored, and when the stored computer program is executed on a computer, the computer is configured to execute the camera control method provided in the embodiments of the present disclosure.

In a fourth aspect, the present disclosure provides an electronic equipment, comprising: a plurality of cameras, each camera has a different focal length, and each camera is configured to capture a preview image for preview when it is in the shooting preview mode and is operating in the foreground; a display screen, configured to display a preview image captured by the camera operating in the foreground; a storage medium, configured to store a computer program; and a processor, electrically connected to the plurality of cameras and the display screen, configured to execute the computer program, the execution of the processor comprising: detecting a change trend of a focus distance of a first camera operating in the foreground when the first camera is in the shooting preview mode; determining a second camera corresponding to the change trend of the focus distance according to a preset correspondence relationship between the change trend of the focus distance and a camera to be determined; activating the second camera in the background; and switching the second camera to operate in the foreground when the real-time focus distance of the first camera is within a focus distance interval of the second camera, and an image captured by the second camera is set as a preview image.

BRIEF DESCRIPTION OF THE DRAWINGS

In order to explain the technical solutions in the embodiments of the present disclosure clearly, the drawings needed in the descriptions of the embodiments are introduced in the following. Obviously, the drawings in the following descriptions are only for some embodiments of the present disclosure. For those of ordinary skill in the art, other drawings can be derived based on these drawings without a creative work.

DETAILED DESCRIPTION

Please refer to the drawings, where the same component symbols represent the same components. In principle, the present disclosure is to be implemented in an appropriate computing environment. The following descriptions are based on exemplified embodiments of the present disclosure, which should not be regarded as a limitation of the present disclosure.

Figure 1:
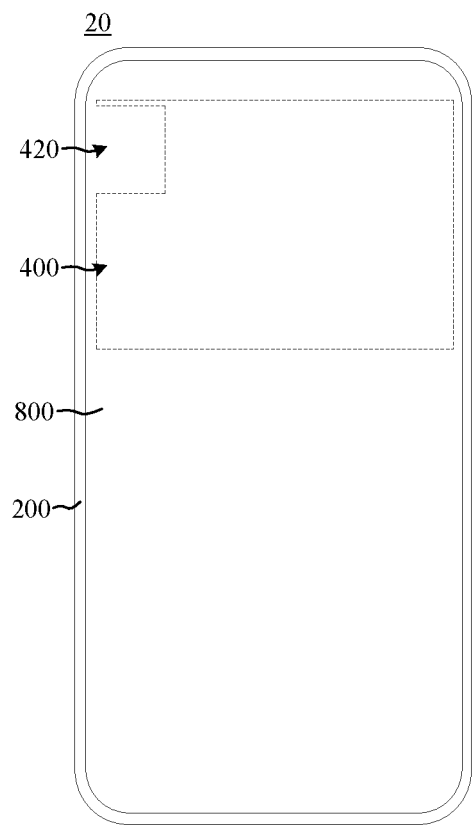
FIG. 1 is a block diagram of an electronic equipment according to an embodiment of the present disclosure.

The embodiment of the present disclosure comprises a camera control method, which is applied to an electronic equipment. Please refer to FIG. 1, FIG. 1 is a block diagram of an electronic equipment to which the camera control method is applied. The electronic equipment 20 can be a computing device such as a laptop computer, a computer monitor containing an embedded computer, a tablet computer, a cell phone, a media player, or other handheld or portable electronic equipment, smaller devices (such as wristwatch devices, pendant devices, earphones or handset devices, devices embedded in eyeglasses or other devices worn on the user's head, or other wearable or miniature devices.), televisions, computer monitors that do not contain embedded computers, game devices, navigation devices, embedded systems (such as systems in which electronic equipment with displays are installed in kiosks or cars), devices that implement the functions of two or more of these devices, or other electronic equipment. In the exemplary configuration of FIG. 1, the electronic equipment 20 is a portable device, such as a cell phone, a media player, a tablet computer, or other portable computing device. Other configurations can be used for the electronic equipment 20 if necessary. It should be noted that the structure shown in FIG. 1 is only exemplary.

As shown in FIG. 1, the electronic equipment 20 includes a case such as the case 200. The case 200 may be made of plastic, glass, ceramic, fiber composite material, metal (for example, stainless steel, aluminum, etc.), other suitable materials, or a combination of any two or more of these materials. The case 200 may be formed using a one-piece configuration, wherein some or all of the case 200 is processed or molded into a single structure, or the case 200 may be formed using multiple structures (for example, an inner frame structure, one or more structures forming the outer shell surface, etc.).

The case 200 can be used as a carrier of the electronic equipment 20 and can carry components of the electronic equipment 20.

As shown in FIG. 1, the electronic equipment 20 may also include a circuit board such as the circuit board 400. The circuit board 400 can be used as a main board of the electronic equipment 20, and the circuit board 400 can integrate a processor, a storage medium, a camera, or other devices. The storage medium of the electronic equipment 20 can store various computer programs and data of the electronic equipment 20. The processor of the electronic equipment 20 can be a control center of the electronic equipment 20, which can connect various parts of the entire electronic equipment 20 by using various interfaces and lines. By operating or calling the computer programs and the data stored in the storage medium, various functions of the electronic equipment 20 can be executed and the data can be processed.

For example, the processor can control the camera of the electronic equipment 20 to take pictures.

Figure 2:
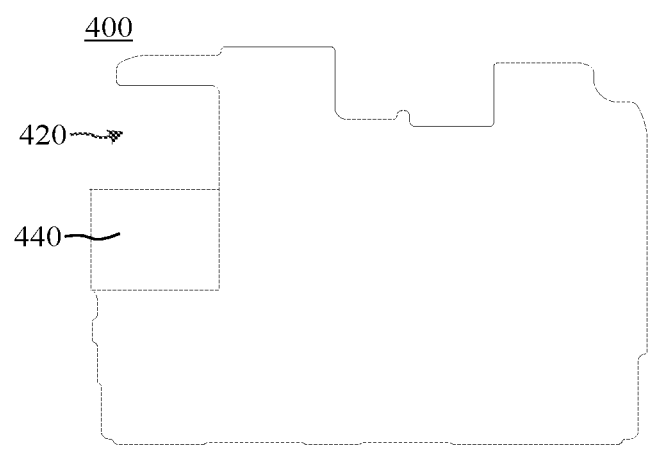
FIG. 2 is a schematic diagram of a circuit board in the electronic equipment shown in FIG. 1.

As shown in FIG. 2, FIG. 2 is a schematic diagram of the structure of the circuit board in the electronic equipment shown in FIG. 1. The circuit board 400 may integrate multiple functional devices of the electronic equipment 20, such as a camera, a sensor, etc. In some embodiments, one or more mounting areas such as the mounting area 440 may be provided on the circuit board 400. The mounting area 440 can install various functional devices of the electronic equipment 20, such as a camera.

In some embodiments, one or more storage spaces such as the storage space 420 may also be provided on the circuit board 400. The storage space 420 can store functional devices of the electronic equipment 20, or in other words, the storage space 420 can keep clear for functional devices of the electronic equipment 20, such as a camera.

The storage space 420 may be a notch or a groove provided on the edge of the circuit board 400. The storage space 420 may also be a through hole by penetrating the circuit board 400 in the thick direction of the circuit board 400, or a hollowed setting. Wherein, the mounting area 440 can arrange the circuits of the circuit board 400.

It can be understood that the mounting area 440 and the storage space 420 on the electronic equipment 400 may be spaced apart from each other. It should be noted that one of the mounting areas 440 and one of the storage spaces 420 on the electronic equipment 400 may be arranged adjacent to each other.

Figure 3:
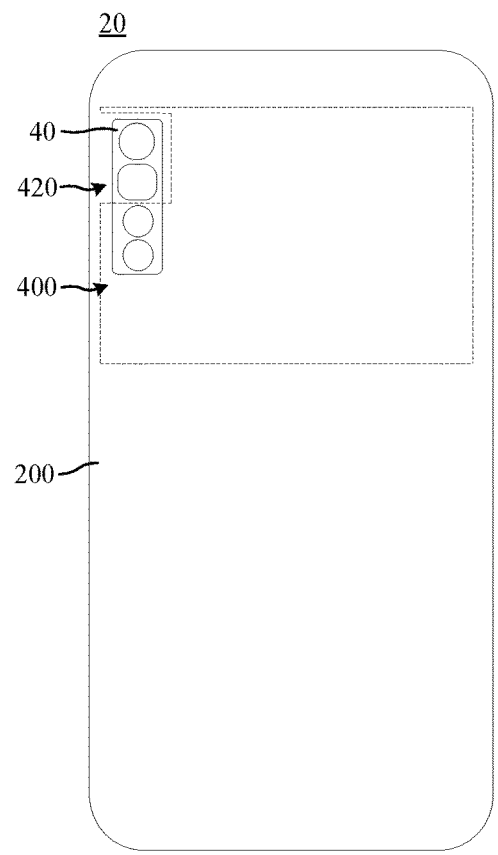
FIG. 3 is a rear view of the electronic equipment shown in FIG. 1.

Please refer to FIG. 3, which is a rear view of the electronic equipment shown in FIG. 1. The electronic equipment 20 may also include a camera module 40. The camera module 40 can be arranged on the case 200 of the electronic equipment 20, for example, the camera module 40 can be arranged at the back cover of the case 200, and the camera module 40 can be used as a rear camera of the electronic equipment 20. It should be noted that the camera module 40 can also be used as a front camera of the electronic equipment 20, and the camera module 40 can be set at the position of the display screen of the electronic equipment 20.

Figure 4:
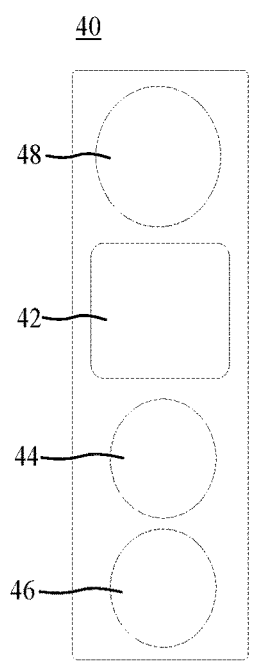
FIG. 4 is a schematic diagram of the structure of the camera module in the electronic equipment shown in FIG. 3.

Please refer to FIG. 4, FIG. 4 is a block diagram of the camera module in the electronic equipment shown in FIG. 3. The camera module 40 may include at least two cameras. At least one camera is installed on the circuit board 400.

For example, at least one camera may be installed on the mounting area 440 of the circuit board 400. At least one camera may be installed in the storage space 420 created on the circuit board 400.

It can be understood that, in general, each of a plurality of cameras of the camera module 40 has a different function, and the size of each camera is also different.

For example, some cameras in the camera module 40 have a higher height and some have a lower height. In an embodiment of the present disclosure, a camera with a higher height can be installed in the storage space 420 created on the circuit board 400, and a camera with a lower height can be installed in the mounting area 440 on the circuit board 400. Compared with installing all cameras on the circuit board 400, the thickness of the circuit board 400 and the camera module 40 stacked on each other can be reduced. Moreover, compared with installing all cameras in the storage space 420 created on the circuit board 400, the wiring arrangement on the circuit board 400 will be increased.

It should be noted that, as electronic equipment has more and more functions and more and more internal devices, the space of the circuit board 400 is becoming more and more limited. The present disclosure not only reducing the thickness of the electronic equipment 20 as a whole, but also increasing the size of the circuit board for arranging circuits, which can accommodate more functions and control settings on the circuit board 400.

Exemplarily, the camera module 40 may include an A camera 42, a B camera 44, a C camera 46, and a D camera

48. Wherein, the height of at least one of the A camera 42 and the D camera 48 is larger than the height of the B camera 44 and the C camera 46.

For example, the height of the A camera 42 is larger than the height of the B camera 44 and the C camera 46, and the height of the D camera 48 is substantially equal to the height of the B camera 44 or the C camera 46. For another example, the heights of both the A camera 42 and the D camera 48 are larger than the heights of the B camera 44 and the C camera 46. Wherein, the heights of the B camera 44 and the C camera 46 are approximately the same. In an embodiment of the present disclosure, the A camera 42 and the D camera 48 can be installed in the storage space 420 created on the circuit board 400, and the B camera 44 and the C camera 46 can be installed in the mounting area 46 of the circuit board 400. This facilitates the overall height arrangement of the camera module 40 and can reduce the thickness of the electronic equipment 20 to a larger extent.

The present disclosure provides a camera control method applied to an electronic equipment, the electronic equipment comprises a plurality of cameras with different focal lengths, and the camera control method comprises:

detecting a change trend of a focus distance of a first camera operating in the foreground when the first camera is operating in the shooting preview mode, and an image captured by the first camera is set as a preview image;

determining a second camera corresponding to the change trend of the focus distance according to a preset correspondence relationship between the change trend of the focus distance and a camera to be determined;

activating the second camera in the background; and switching the second camera to operate in the foreground when the real-time focus distance of the first camera is within a focus distance interval of the second camera, and an image captured by the second camera is set as a preview image.

Optionally, in an embodiment, wherein determining a second camera corresponding to the change trend of the focus distance according to a preset correspondence relationship between the change trend of the focus distance and a camera to be determined comprises:

determining a camera with a focal length larger than the focal length of the first camera as a second camera when the change trend of the focus distance continues to increase within a preset time period; or determining a camera with a focal length smaller than the focal length of the first camera as a second camera when the change trend of the focus distance continues to decrease within a preset time period.

Optionally, in an embodiment, wherein determining a camera with a focal length larger than the focal length of the first camera as a second camera when the change trend of the focus distance is continuously increasing within a preset time period comprises:

determining a camera with the smallest focal length among a plurality of cameras with each of their focal lengths larger than the first camera as a second camera when the change trend of the focus distance continues to increase within a preset time period and there is a plurality of cameras with each of their focal lengths larger than the first camera.

Wherein determining a camera with a focal length smaller than the focal length of the first camera as a second camera when the change trend of the focus distance continues to decrease within a preset time period comprises:

determining a camera with the largest focal length among a plurality of cameras with each of their focal lengths smaller than the first camera as a second camera when the change trend of the focus distance continues to decrease within a preset time period and there is a plurality of cameras with each of their focal lengths smaller than the first camera.

Optionally, in an embodiment, wherein after switching the second camera to operate in the foreground, the method further comprises:

deactivating a third camera when the focal length of the second camera is larger than the focal length of the first camera, and the third camera with a focal length smaller than the first camera is activated in the background; or deactivating a fourth camera when the focal length of the second camera is smaller than the first camera, and the fourth camera with a focal length larger than the first camera is activated in the background.

Optionally, in an embodiment, wherein switching the second camera to operate in the foreground when the real-time focus distance of the first camera is within a focus distance interval of the second camera, and an image captured by the second camera is set as a preview image comprises:

switching the second camera to operate in the foreground and an image captured by the second camera is set as a preview image when the real-time focus distance of the first camera is within a focus distance interval of the second camera and an image captured by the second camera overlaps with the content of the preview image captured by the first camera.

Optionally, in an embodiment, wherein after determining a second camera corresponding to the change trend of the focus distance, the method further comprises:

activating the second camera to operate in the foreground directly when the real-time focus distance of the first camera is within a focus distance interval of the second camera and the second camera is not activated in the background.

Optionally, in an embodiment, wherein the camera control method further comprises: performing a blur processing on the preview image captured by the first camera during the activation of the second camera.

Optionally, in an embodiment, wherein performing a blur processing on the preview image captured by the first camera comprises: performing a Gaussian blur processing on the preview image captured by the first camera.

Optionally, in an embodiment, wherein detecting a change trend of the focus distance of the first camera operating in the foreground comprises:

obtaining the focus distances of the first camera at two adjacent time points by sampling at a preset time interval; and obtaining the change trend of the focus distance according to the relationship between the focus distances at two adjacent time points.

Figure 5:
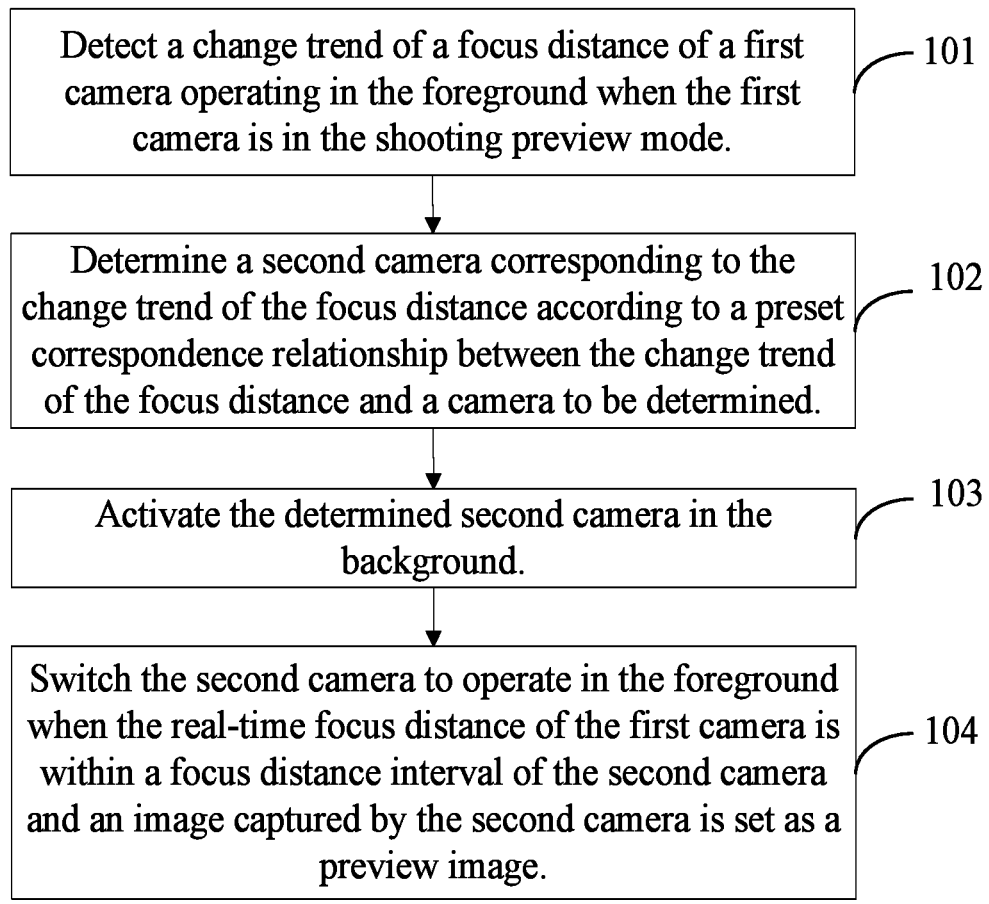
FIG. 5 is a schematic flowchart of a camera control method according to an embodiment of the present disclosure.

Based on the structure of the above electronic equipment, the camera control method provided by the embodiment of the present disclosure is described. Please refer to FIG. 5, FIG. 5 is a schematic flowchart of the camera control method provided by the embodiment of the present disclosure. The camera control method is applied to a electronic equipment provided in an embodiment of the present disclosure, and the electronic equipment includes a plurality of cameras with different focal lengths. As shown in FIG. 5, the process of the camera control method provided in an embodiment of the present disclosure may be as follows:

In 101, detect a change trend of a focus distance of a first camera operating in the foreground when the first camera is operating in the shooting preview mode, and an image captured by the first camera is set as a preview image.

It should be noted that in this embodiment of the present disclosure, the electronic equipment includes a plurality of cameras with different focal lengths, such as two cameras, three cameras, four cameras, and so on. Taking four cameras as an example, please refer to FIG. 4.

The electronic equipment includes A camera 42, B camera 44, C camera 46, and D camera 48, wherein the focal length of D camera 48 is smaller than the focal length of C camera 46, the focal length of C camera 46 it is smaller than the focal length of the A camera 42, and the focal length of the A camera 42 is smaller than the focal length of the B camera 44. It is understandable that cameras with different focal lengths are suitable for different shooting distances.

The electronic equipment can turn on the shooting preview mode according to a user's operation instruction. When the shooting preview mode is turned on, the electronic equipment activates the user-configured or default-configured camera to operate in the foreground, so as to capture the preview image through the camera operating in the foreground and pass it through the display screen to display the preview image captured by the camera operating in the foreground.

In addition, the electronic equipment can also adjust the focus distance of the camera operating in the foreground according to the user's operation to shoot objects at different distances. For example, the focus distance can be increased to shoot objects at a longer distance, and the focus distance can be reduced to shoot objects at a closer distance.

It should be noted that, in an embodiment of the present disclosure, the camera operating in the foreground of the electronic equipment for capturing preview images is referred to as the first camera, and the first camera may be any one of a plurality of cameras included in the electronic equipment.

For example, taking the four cameras shown in FIG. 4 as an example, in the default configuration, the camera that is activated to operate in the foreground when the shooting preview mode is turned on of the electronic equipment is A camera 42.

In the shooting preview mode, the electronic equipment detects the change trend of the focus distance of the first camera operating in the foreground and obtains the detection result.

Wherein, when detecting the change trend of the focus distance of the first camera operating in the foreground, the electronic equipment can sample the focus distances of the first camera at two adjacent time points according to a preset time interval (the preset time interval can be empirically set by a person of ordinary skill in the art according to an actual need, for example, set to 500 seconds), and then compare the relationship between the focus distances at the two adjacent time points. If the focus distance at the later time point is larger than the focus distance at the previous time point, the change trend of the focus distance of the first camera is larger. If the focus distance at the later time point is smaller than the focus distance at the previous time point, the change trend of the focus distance of the first camera is smaller.

In 102, determine a second camera corresponding to the change trend of the focus distance according to a preset correspondence relationship between the change trend of the focus distance and a camera to be determined.

As mentioned above, a plurality of cameras included in the electronic equipment are respectively suitable for shooting scenes at different distances. It can be understood that when the focus distance of the first camera operating in the foreground becomes larger, it indicates that the user wants to shoot objects at a longer distance. When the focus distance change trend of the first camera operating in the foreground becomes smaller, it indicates that the user wants to shoot objects at a closer distance. Based on this, the correspondence between the focus distance change trend and the camera is also preset in the electronic equipment.

Correspondingly, after detecting the change trend of the focus distance of the first camera operating in the foreground, the electronic equipment further determines a camera corresponding to the change trend of the focus distance of the first camera according to a preset correspondence relationship between the change trend of the focus distance and a camera to be determined, and the electronic equipment notes the determined camera as a second camera.

In 103, activate the second camera in the background.

After determining the second camera, the electronic equipment activates the second camera in the background and is ready to switch the second camera to operate in the foreground.

It should be noted that when the second camera is activated in the background, it will capture images in real time. However, the electronic equipment does not set the image captured by the second camera as a preview image, but the image captured by the first camera in real time is set as a preview image.

In 104, switch the second camera to operate in the foreground when the real-time focus distance of the first camera is within a focus distance interval of the second camera and an image captured by the second camera is set as a preview image.

It should be noted that, according to different scenes of shooting distances among a plurality of cameras included in the electronic equipment, each camera is divided into a corresponding focus distance interval. Wherein, the focus distance interval divided for each camera does not exceed the actual focus distance that can be achieved.

For example, taking the four cameras shown in FIG. 4 as an example, the focus distance interval corresponding to the D camera 48 is [a, b), the focus distance interval corresponding to the A camera 42 is [b, c), the focus distance corresponding to the C camera 46 is [c, d), and the focus distance interval corresponding to the B camera 44 is [d, e], wherein the relationship of the focus distances is $a<b<c<d<e$.

In an embodiment of the present disclosure, when the electronic equipment detects that the real-time focus distance of the first camera is within a focus distance interval of the second camera, the second camera is switched to operate in the foreground and becomes a new first camera. At the same time, the previous first camera is switched to operate in the background, and set the image captured by the second camera as a preview image. That is, use the new first camera to capture the preview image for preview, and the captured preview image is displayed on the screen.

For example, taking the four cameras shown in FIG. 4 as an example, the first camera activated by default is the A camera 42. If the second camera is the B camera 44. While the B camera 44 is switched to operate in the foreground, the A camera 42 is switched to operate in the background. After the switching is completed, the B camera 44 becomes a new first camera.

It can be seen above that, in an embodiment of the present disclosure, the electronic equipment includes a plurality of cameras with different focal lengths. When in the shooting preview mode, it detects the change trend of the focus distance of the first camera operating in the foreground, determines a second camera corresponding to the change trend of the focus distance according to a preset correspondence relationship between the change trend of the focus distance and a camera to be determined, and then activates the second camera in the background. When the real-time focus distance of the first camera is within a focus distance interval of the second camera, the second camera is switched to operate in the foreground operation, and an image captured by the second camera is set as a preview image. Therefore, by activating the cameras that need to be switched in advance, there is no need to activate the camera that need to be switched in real time, which can save the waiting time during the switching, thereby avoiding getting stuck in the preview image.

In an embodiment, wherein switching the second camera to operate in the foreground when the real-time focus distance of the first camera is within a focus distance interval of the second camera, and an image captured by the second camera is set as a preview image comprises switching the second camera to operate in the foreground and an image captured by the second camera is set as a preview image when the real-time focus distance of the first camera is within a focus distance interval of the second camera and an image captured by the second camera overlaps with the content of the preview image captured by the first camera.

Wherein, the electronic equipment does not immediately switch the second camera to operate in the foreground when the real-time focus distance of the first camera is within a focus distance interval of the second camera, but first determines whether the content of the image captured by the first camera and the content of the image captured by second camera are overlapped. If the content of the image captured by the first camera and the content of the image captured by the second camera are overlapped, the second camera is switched to the foreground and becomes a new first camera, so that the preview image for previewing is captured by the new first camera.

Since there is no sudden jump in the preview image content when switching cameras in the embodiments of the present disclosure, it is possible to realize a seamless switching of cameras.

In an embodiment, wherein determining a second camera corresponding to the change trend of the focus distance according to a preset correspondence relationship between the change trend of the focus distance and a camera to be determined comprises: determining a camera with a focal length larger than the focal length of the first camera among a plurality of cameras as a second camera when the change trend of the focus distance continues to increase within a preset time period.

In an embodiment of the present disclosure, wherein the preset correspondence relationship between the change trend of the focus distance and a camera to be determined comprises: when the change trend of the focus distance continues to increase within a preset time period, the corresponding camera is a camera with a focal length larger than that of the first camera.

Wherein, the preset time period is at least two preset time intervals as a constraint, and the value of the preset time period can be configured by those of ordinary skill in the art according to an actual need. For example, when the preset time interval is configured to be 500 milliseconds, the preset time period can be configured as 1 second.

Correspondingly, when the electronic equipment determines a second camera corresponding to the change trend of the focus distance according to a correspondence relationship between the change trend of the focus distance and a camera to be determined, it first obtains the change trend of the focus distance of the first camera within a preset time period. For example, if the preset time interval for sampling the change trend of the focus distance is configured to be 500 milliseconds, and the preset time period is configured to be 1 second, the electronic equipment can obtain the two focus distances sampled within 1 second from the current time. If the change trend of the acquired two focus distances become larger, it can be determined that the focus distance change trend continues to increase within a preset time period.

When it is determined that the change trend of the focus distance of the first camera continues to increase within a preset time period, the electronic equipment determines a camera with a focal length larger than the first camera among a plurality of cameras as a second camera. Wherein, if the camera with a focal length larger than the first camera is not unique, that is, when there is a plurality of cameras with each of their focal lengths larger than the first camera, the electronic equipment determines the camera with the smallest focal length among a plurality of cameras with each of their focal lengths larger than the first camera as a second camera. That is, the camera whose focal length is closest to the first camera is determined as a second camera.

For example, taking the four cameras shown in FIG. 4 as an example, the first camera is the D camera 48 with the smallest focal length. At this time, the camera with a focal length larger than the first camera is not unique, including A camera 42, B camera 44, and C camera 46.

In this case, the electronic equipment determines the C camera 46 with the smallest focal length as a second camera.

In an embodiment, after the second camera is switched to operate in the foreground, the method further includes:

If there is a third camera with a focal length smaller than that of the first camera being activated in the background, then the third camera is deactivated.

In an embodiment of the present disclosure, after the camera with a focal length larger than the first camera among a plurality of cameras included in the electronic equipment is determined as a second camera, and the second camera is switched to operate in the foreground, identify whether there is still an activated camera with a focal length smaller than the previous first camera in the background, which is referred to as a third camera.

If it is identified that a third camera has been activated in the background, the electronic equipment deactivates the third camera to save power consumption.

In an embodiment, wherein determining a second camera corresponding to the change trend of the focus distance according to a preset correspondence relationship between the change trend of the focus distance and a camera to be determined comprises determining a camera with a focal length smaller than the focal length of the first camera among a plurality of cameras as a second camera when the change trend of the focus distance continues to decrease within a preset time period.

In an embodiment of the present disclosure, wherein the preset correspondence relationship between the change trend of the focus distance and a camera to be determined comprises:

when the change trend of the focus distance continues to decrease within a preset time period, the corresponding camera is a camera with a focal length smaller than that of the first camera.

Wherein, the preset time period is at least two preset time intervals as a constraint, and the value of the preset time period can be configured by those of ordinary skill in the art according to an actual need. For example, when the preset time interval is configured to be 500 milliseconds, the preset time period can be configured as 1 second.

Correspondingly, when the electronic equipment determines a second camera corresponding to the change trend of the focus distance according to a correspondence relationship between the change trend of the focus distance and a camera to be determined, it first obtains the change trend of the focus distance of the first camera within a preset time period. For example, if the preset time interval for sampling the change trend of the focus distance is configured to be 500 milliseconds, and the preset time period is configured to be 1 second, the electronic equipment can obtain the two focus distances sampled within 1 second from the current time. If the change trend of the acquired two focus distances become smaller, it can be determined that the focus distance change trend continues to decrease within a preset time period.

When it is determined that the change trend of the focus distance of the first camera continues to decrease within a preset time period, the electronic equipment determines a camera with a focal length smaller than the first camera among a plurality of cameras is a second camera. Wherein, if the camera with a focal length smaller than the first camera is not unique, that is, when there is a plurality of cameras with each of their focal lengths smaller than the first camera, the electronic equipment determines the camera with the largest focal length among a plurality of cameras with each of their focal lengths smaller than the first camera as a second camera. That is, the camera whose focal length is closest to the first camera is determined as a second camera.

For example, taking the four cameras shown in FIG. 4 as an example, the first camera is the B camera 44 with the largest focal length. At this time, the camera with a focal length smaller than the first camera is not unique, including A camera 42, C camera 46, and D camera 48. In this case, the electronic equipment determines the A camera 42 with the largest focal length as a second camera.

In an embodiment, after the second camera is switched to operate in the foreground, the method further includes:

If there is a fourth camera with a focal length larger than that of the first camera being activated in the background, then the fourth camera is deactivated.

In an embodiment of the present disclosure, after the camera with a focal length smaller than the first camera among a plurality of cameras included in the electronic equipment is determined as a second camera, and the second camera is switched to operate in the foreground, identify whether there is still an activated camera with a focal length larger than the previous first camera in the background which is referred to as a fourth camera.

If it is identified that a fourth camera has been activated in the background, the electronic equipment deactivates the fourth camera to save power consumption.

In an embodiment, wherein after determining a second camera corresponding to the change trend of the focus distance, the method further comprises:

when the real-time focus distance of the first camera is within a focus distance interval of the second camera and the second camera is not activated in the background, the second camera is directly activated to operate in the foreground.

It should be noted that when the user adjusts the focus distance of the first camera too quickly, or directly adjusts the focus distance to within a focus distance interval of the second camera, the electronic equipment will not be able to activate the second camera in time in the background. In the situation that the real-time focus distance of the first camera is within a focus distance interval of the second camera and the second camera is not activated in the background, the electronic equipment directly activates the second camera to operate in the foreground.

In an embodiment, the camera control method provided in the present disclosure further comprises: performing a blur processing on the preview image captured by the first camera during the activation of the second camera.

It should be noted that it takes a certain amount of time to activate the camera. In the embodiment of the present disclosure, in order to reduce the feeling of getting stuck caused by activating the second camera, during the activate of the second camera, the preview image captured by the first camera is blurred.

There is no specific limitation on the method configured to blur the preview image captured by the first camera in the embodiment of the present disclosure, and the blur processing method can be determined by a person of ordinary skill in the art according to an actual need. For example, in the embodiment of the present disclosure, the electronic equipment performs Gaussian blur processing on the preview image captured by the first camera, so that the cutting process of the camera is smoother.

Figure 6:
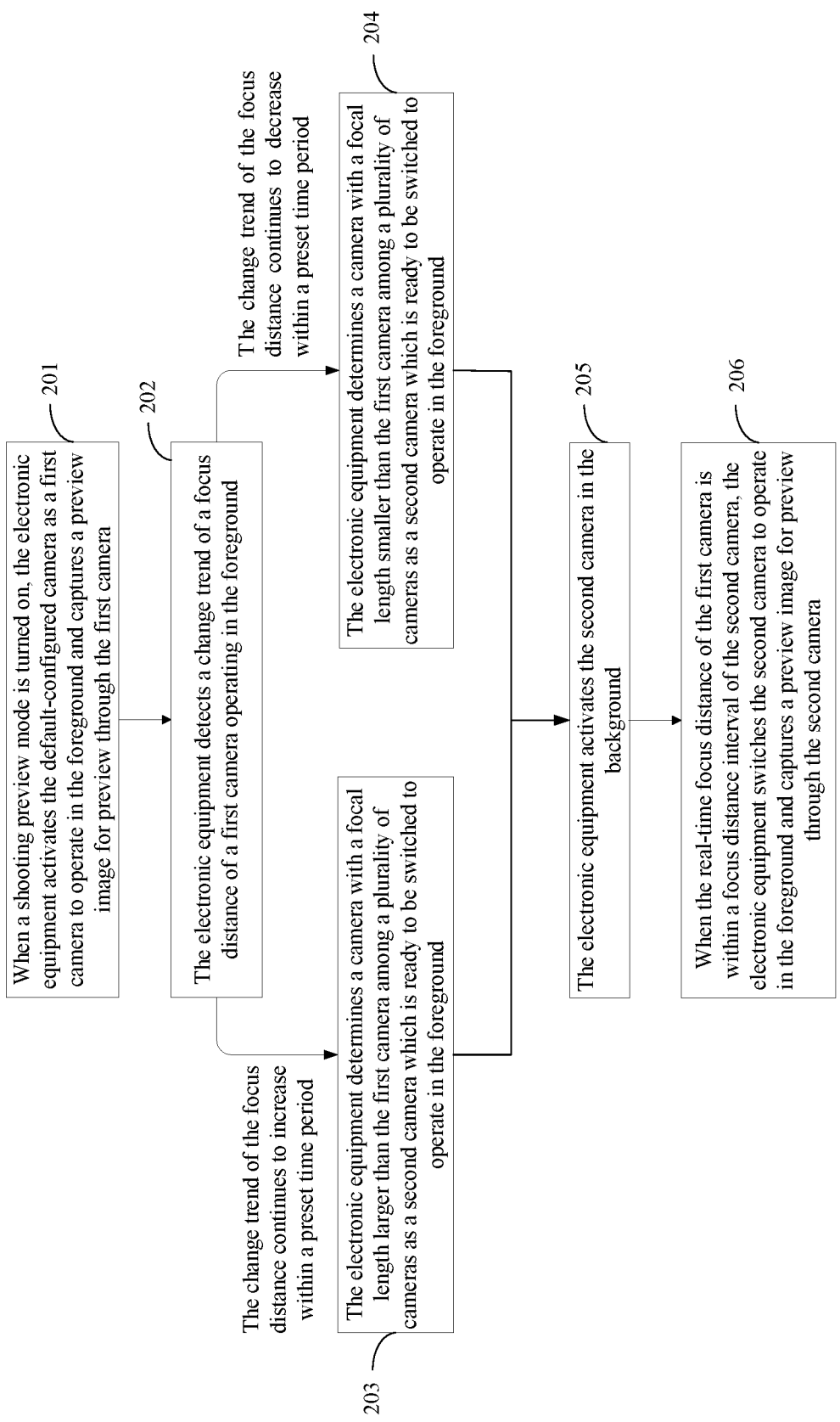
FIG. 6 is another schematic flowchart of a camera control method according to an embodiment of the present disclosure.

Please refer to FIG. 6. FIG. 6 is a schematic diagram of another flow chart of a camera control method according to an embodiment of the present disclosure. The camera control method is applied to an electronic equipment according to an embodiment of the present disclosure. For example, the electronic equipment includes a plurality of cameras with different focal lengths. The process of the camera control method may include:

In 201, when the shooting preview mode is turned on, the electronic equipment activates the default-configured camera as a first camera to operate in the foreground and captures a preview image for preview through the first camera.

Wherein, the electronic equipment can turn on the shooting preview mode according to user's operation instruction. When the shooting preview mode is turned on, the electronic equipment activates the camera with a default configuration to operate in the foreground to capture the preview image through the camera operating in the foreground and display the preview image captured by the camera operating in the foreground on the display screen.

It should be noted that, in an embodiment of the present disclosure, the camera operating in the foreground of the electronic equipment for capturing a preview image is referred to as a first camera, and the first camera may be any one of a plurality of cameras included in the electronic equipment.

For example, taking the four cameras shown in FIG. 4 as an example, the camera that is activated to operate in the foreground when the shooting preview mode is turned on in a default configuration of the electronic equipment is the A camera 42.

In 202, the electronic equipment detects the change trend of the focus distance of the first camera operating in the foreground, and if the change trend of the focus distance continues to increase within a preset time period, then go to 203. If the change trend of the focus distance continues to decrease within a preset time period, then go to 204.

In the shooting preview mode, the electronic equipment detects the change trend of the focus distance of the first camera operating in the foreground and obtains the detection result.

Wherein, when detecting the change trend of the focus distance of the first camera operating in the foreground, the electronic equipment can sample the focus distances of the first camera at two adjacent time points according to a preset time interval (the preset time interval can be empirically set by a person of ordinary skill in the art according to an actual need, for example, set to 500 seconds), and then compare the relationship between the focus distances at the two adjacent time points. If the focus distance at the later time point is larger than the focus distance at the previous time point, the change trend of the focus distance of the first camera is larger. If the focus distance at the later time point is smaller than the focus distance at the previous time point, the change trend of the focus distance of the first camera is smaller.

In 203, the electronic equipment determines a camera with a focal length larger than the first camera among a plurality of cameras as a second camera which is ready to be switched to operate in the foreground, and then go to 205.

In an embodiment of the present disclosure, wherein the preset correspondence relationship between the change trend of the focus distance and a camera to be determined comprises when the change trend of the focus distance continues to increase within a preset time period, the corresponding camera is a camera with a focal length larger than that of the first camera.

Wherein, the preset time period is at least two preset time intervals as a constraint, and the value of the preset time period can be configured by those of ordinary skill in the art according to an actual need. For example, when the preset time interval is configured to be 500 milliseconds, The preset time period can be configured as 1 second.

Correspondingly, when the electronic equipment determines a second camera corresponding to the change trend of the focus distance according to a correspondence relationship between the change trend of the focus distance and a camera to be determined, it first obtains the change trend of the focus distance of the first camera within a preset time period. For example, if the preset time interval for adopting the change trend of the focus distance is configured to be 500 milliseconds, and the preset time period is configured to be 1 second, the electronic equipment can obtain the two focus distances sampled within 1 second from the current time. If the change trend of the acquired two focus distances become larger, it can be determined that the focus distance change trend continues to increase within a preset time period.

When it is determined that the change trend of the focus distance of the first camera continues to increase within a preset time period, the electronic equipment determines a camera with a focal length larger than the first camera among a plurality of cameras as a second camera.

Wherein, if the camera with a focal length larger than the first camera is not unique, that is, when there is a plurality of cameras with each of their focal lengths larger than the first camera, the electronic equipment determines the camera with the smallest focal length among a plurality of cameras with each of their focal lengths larger than the first camera as a second camera. That is, the camera whose focal length is closest to the first camera is determined as a second camera.

For example, taking the four cameras shown in FIG. 4 as an example, the first camera is the D camera 48 with the smallest focal length. At this time, the camera with a focal length larger than the first camera is not unique, including A camera 42, B camera 44, and C camera 46 in this case, the electronic equipment determines the C camera 46 with the smallest focal length as a second camera.

In 204, the electronic equipment determines a camera with a focal length smaller than the first camera among a plurality of cameras as a second camera which is ready to be switched to operate in the foreground.

In an embodiment of the present disclosure, a preset correspondence relationship between the change trend of the focus distance and a camera to be determined further comprises: the change trend of the focus distance is that it continues to decrease within a preset time period, and the corresponding camera is a camera with a focal length smaller than that of the first camera.

Wherein, the preset time period is at least two preset time intervals as a constraint, and the value of the preset time period can be configured by those of ordinary skill in the art according to an actual need. For example, when the preset time interval is configured to be 500 milliseconds, the preset time period can be configured as 1 second.

Correspondingly, when the electronic equipment determines a second camera corresponding to the change trend of the focus distance according to a correspondence relationship between the change trend of the focus distance and a camera to be determined, it first obtains the change trend of the focus distance of the first camera within a preset time period. For example, if the preset time interval for adopting the change trend of the focus distance is configured to be 500 milliseconds, and the preset time period is configured to be 1 second, the electronic equipment can obtain the two focus distances sampled within 1 second from the current time. If the change trend of the acquired two focus distances become smaller, it can be determined that the focus distance change trend continues to decrease within a preset time period.

When it is determined that the focus distance change trend of the first camera continues to decrease within a preset time period, the electronic equipment determines that the focus distance change trend of the first camera continues to decrease within a preset time period, and the electronic equipment determines a camera with a focal length smaller than the first camera among a plurality of cameras is a second camera.

Wherein, if the camera with a focal length smaller than the first camera is not unique, that is, when there is a plurality of cameras with each of their focal lengths smaller than the first camera, the electronic equipment determines the camera with the largest focal length among a plurality of cameras with each of their focal lengths smaller than the first camera as a second camera. That is, the camera whose focal length is closest to the first camera is determined as a second camera.

For example, taking the four cameras shown in FIG. 4 as an example, the first camera is the B camera 44 with the largest focal length. At this time, the camera with a focal length smaller than the first camera is not unique, including the A camera 42, C camera 46, and D camera 48. In this case, the electronic equipment determines the A camera 42 with the largest focal length as a second camera.

In 205, the electronic equipment activates the second camera in the background.

After determining the second camera, the electronic equipment activates the second camera in the background and is ready to switch the second camera to operate in the foreground.

In 206, when the real-time focus distance of the first camera is within a focus distance interval of the second camera, the electronic equipment switches the second camera to operate in the foreground and captures a preview image for preview through the second camera.

It should be noted that, according to different scenes of shooting distances among a plurality of cameras included in the electronic equipment, each camera is divided into a corresponding focus distance interval. Wherein, the focus distance interval divided for each camera does not exceed the actual focus distance that can be achieved.

For example, taking the four cameras shown in FIG. 4 as an example, the focus distance interval corresponding to the D camera 48 is [a, b), the focus distance interval corresponding to the A camera 42 is [b, c), the focus distance corresponding to the C camera 46 is [c, d), and the focus distance interval corresponding to the B camera 44 is [d, e], wherein the relationship of the focus distances is a<b<c<d<e.

In an embodiment of the present disclosure, when the electronic equipment detects that the real-time focus distance of the first camera is within a focus distance interval of the second camera, the second camera is switched to operate in the foreground and becomes a new first camera. At the same time, the previous first camera is switched to operate in the background, so that a preview image for preview is captured through the new first camera, and the captured preview image is displayed on the screen.

For example, taking the four cameras shown in FIG. 4 as an example, the first camera activated by default is the A camera 42. If the second camera is the B camera 44. While the B camera 44 is switched to operate in the foreground, the A camera 42 is switched to operate in the background. After the switching is completed, the B camera 44 becomes a new first camera.

Figure 7:
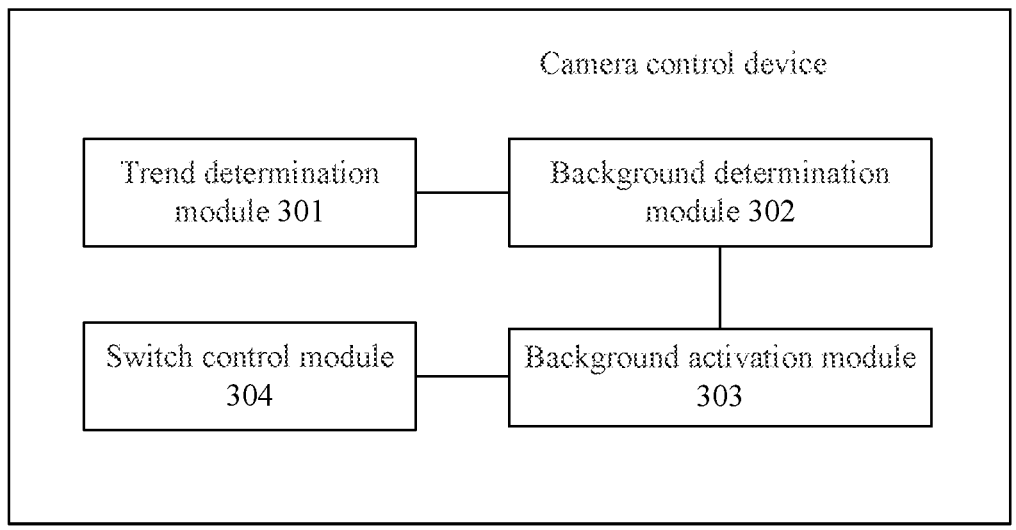
FIG. 7 is a block diagram of a camera control device according to an embodiment of the present disclosure.

The embodiment of the present disclosure also provides a camera control device. Please refer to FIG. 7, FIG. 7 is a block diagram of a camera control device according to an embodiment of the present disclosure. The camera control device is applied to an electronic equipment, and the electronic equipment includes a plurality of cameras with different focal lengths. The camera control device includes a trend determination module 301, a background determination module 302, a background activation module 303, and a switch control module 304, as follows:

The trend determination module 301 is configured to detect the change trend of the focus distance of the first camera operating in the foreground when the camera is in the shooting preview mode, and an image captured by the first camera is set as a preview image.

The background determination module 302 is configured to determine a second camera corresponding to the change trend of the focus distance according to a preset correspondence relationship between the change trend of the focus distance and a camera to be determined.

The background activation module 303 is configured to activate the second camera in the background.

The switch control module 304 is configured to switch the second camera to operate in the foreground when the real-time focus distance of the first camera is within a focus distance interval of the second camera, and set the image captured by the second camera is set as a preview image.

In an embodiment, when determining a second camera corresponding to the change trend of the focus distance according to a preset correspondence relationship between the change trend of the focus distance and a camera to be determined, the background determination module 302 is configured to:

When the change trend of the focus distance continues to increase within a preset time period, a camera with a focal length larger than the first camera among a plurality of cameras is determined as a second camera; or When the change trend of the focus distance continues to decrease within a preset time period, the camera with a focal length smaller than the first camera among a plurality of cameras is determined as a second camera.

In an embodiment, when the focus distance change trend continues to increase within a preset time period, when a camera with a focal length larger than the first camera among a plurality of cameras is determined as a second camera, the background determination module 302 is configured to: when the change trend of the focus distance continues to increase within a preset time period, and there is a plurality of cameras with each of their focal lengths larger than the first camera, the camera with the smallest focal length among a plurality of cameras with each of their focal lengths larger than the first camera is determined as a second camera.

When the change trend of the focus distance continues to decrease within a preset time period, and a camera with a focal length smaller than the first camera is determined as a second camera, the background determination module 302 is configured to:

when the change trend of the focus distance continues to decrease within a preset time period, and there is a plurality of cameras with each of their focal lengths smaller than the first camera, the camera with the largest focal length among a plurality of cameras with each of their focal lengths smaller than the first camera is determined as a second camera.

In an embodiment, after the second camera is switched to operate in the foreground, the switch control module 304 is further configured to: when the focal length of the second camera is larger than that of the first camera, and there is a third camera with a focal length smaller than that of the first camera is activated in the background, the third camera is deactivated; or when the focal length of the second camera is smaller than the first camera, and there is a fourth camera with a focal length larger than that of the first camera is activated in the background, the fourth camera is deactivated.

In an embodiment, when the real-time focus distance of the first camera is within a focus distance interval of the second camera, the second camera is switched to operate in the foreground, and an image captured by the second camera is set as a preview image. The switch control module 304 is configured to:

when the real-time focus distance of the first camera is within a focus distance interval of the second camera and an image captured by the second camera overlaps with the content of the preview image captured by the first camera, switch the second camera to operate in the foreground and an image captured by the second camera is set as a preview image.

In an embodiment, after determining a second camera corresponding to the change trend of the focus distance, the switch control module 304 is further configured to:

when the real-time focus distance of the first camera is within a focus distance interval of the second camera and the second camera is not activated in the background, the second camera is directly activated to operate in the foreground.

In an embodiment, the camera control device provided in the present disclosure further includes an image blurring module, configured to:

performing a blur processing on the preview image captured by the first camera during the activation of the second camera.

It should be noted that the camera control device provided in these embodiments of the present disclosure share the same concept as the camera control method in above embodiments.

Any methods provided in the embodiments of camera control method can be operated on the camera control device. Specific procedures for each implementation can be found in the embodiments of the camera control method, which will not be repeated here.

The embodiment of the present disclosure provides a computer-readable storage medium on which a computer program is stored, and when the stored computer program is executed on a computer, the computer is configured to execute the steps in the camera control method provided in an embodiment of the present disclosure. The storage medium may be a magnetic disk, an optical disk, a read-only memory (ROM), or a random-access memory (RAM), etc.

Figure 8:
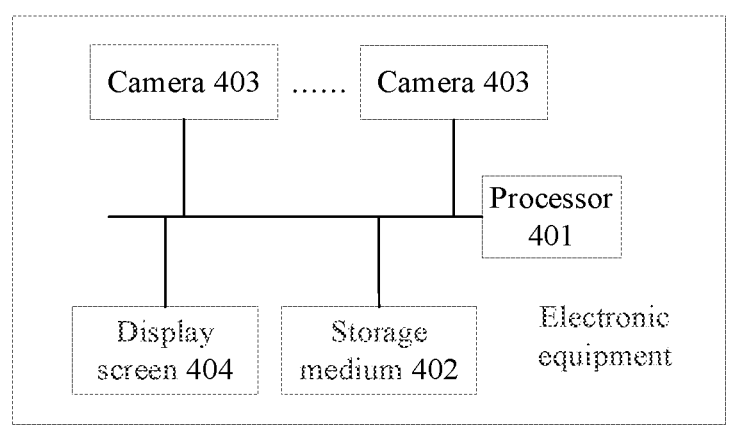
FIG. 8 is a block diagram of an electronic equipment according to an embodiment of the present disclosure.

An embodiment of the present disclosure also provides an electronic equipment. Please refer to FIG. 8. The electronic equipment includes a processor 401, a storage medium 402, a plurality of cameras 403 with different focal lengths, and a display screen 404. The processor 401 is electrically connected to the storage medium 402, the plurality of cameras 403, and the display screen 404.

The processor 401 is the control center of the electronic equipment. It uses various interfaces and lines to connect various parts of the entire electronic equipment. It executes the electronic equipment by operating or loading the computer program stored in the storage medium 402 and calling the data stored in the storage medium 402, executing various functions of the electronic equipment and processing the data.

The storage medium 402 may be configured to store a software program and a module. The processor 401 executes various functional applications and processes data by operating the computer program and the module stored in the storage medium 402. The storage medium 402 may mainly include a program storage area and a data storage area. The program storage area can store an operating system, a computer program targeted for at least one function (such as a sound playback function, an image playback function), etc. The data storage area can store data created according to the use of electronic equipment, etc.

In addition, the storage medium 402 may include a high-speed random-access memory, a non-volatile memory, such as at least one of a magnetic disk storage device, a flash memory device, or other volatile solid-state storage devices. Correspondingly, the storage medium 402 may further include a memory controller to provide the processor 401 with an access to the storage medium 402.

Each camera 403 captures a preview image for preview when it is in the shooting preview mode and is operating in the foreground.

The display screen 404 is configured to display a preview image captured by a camera operating in the foreground.

In an embodiment of the present disclosure, the processor 401 in the electronic equipment will load an instruction corresponding to a processing of one or more computer programs into the storage medium 402 according to the following steps, and executes the one or more computer programs stored in the storage medium 402 by the processor 401, so as to realize various functions in the following detecting a change trend of a focus distance of a first camera 403 operating in the foreground when the first camera is operating in the shooting preview mode; determining a second camera 403 corresponding to the change trend of the focus distance according to a preset correspondence relationship between the change trend of the focus distance and the camera 403 to be determined; activating the second camera 403 in the background; and switching the second camera 403 to operate in the foreground when the real-time focus distance of the first camera 403 is within a focus distance interval of the second camera 403, and the image captured by the second camera 403 is set as a preview image.

In an embodiment, when the second camera 403 corresponding to the change trend of the focus distance is determined according to a preset correspondence relationship between the change trend of the focus distance and a camera to be determined 403, the processor 401 executes when the change trend of the focus distance continues to increase within a preset time period, a camera 403 with a focal length larger than that of the first camera 403 among a plurality of cameras 403 is determined as a second camera 403; or when the change trend of the focus distance continues to decrease within a preset time period, a camera 403 with a focal length smaller than that of the first camera 403 among a plurality of cameras 403 is determined as a second camera 403.

In an embodiment, when the focus distance change trend continues to increase within a preset time period, and a camera 403 with a focal length larger than the first camera 403 among a plurality of cameras 403 is determined to be a second camera 403, the processor 401 further executes: when the change trend of the focus distance continues to increase within a preset time period, and there is a plurality of cameras 403 with each of their focal lengths larger than the first camera 403, the camera 403 with the smallest focal length among a plurality of cameras 403 with each of their focal lengths larger than the first camera 403 is determined as a second camera 403.

When the change trend of the focus distance continues to decrease within a preset time period, and a camera 403 with a focal length smaller than the first camera 403 is determined to be a second camera 403, the processor 401 further executes: when the change trend of the focus distance continues to decrease within a preset time period, and there is a plurality of cameras 403 each of their focal lengths smaller than the first camera 403, the camera 403 with the largest focal length among a plurality of cameras 403 with each of their focal lengths smaller than the first camera 403 is determined as a second cameras 403.

In an embodiment, after the second camera 403 is switched to operate in the foreground, the processor 401 further executes: when the focal length of the second camera 403 is larger than that of the first camera 403, and a third camera 403 with a focal length smaller than that of the first camera 403 is activated in the background, the third camera 403 is deactivated; or when the focal length of the second camera 403 is smaller than the first camera 403, and a fourth camera 403 with a focal length larger than the first camera 403 is activated in the background, the fourth camera 403 is deactivated.

In an embodiment, when the real-time focus distance of the first camera is within a focus distance interval of the second camera, the second camera is switched to operate in the foreground, and an image captured by the second camera is set as a preview image, the processor 401 further executes: when the real-time focus distance of the first camera is within a focus distance interval of the second camera and an image captured by the second camera overlaps with the content of the preview image captured by the first camera, switch the second camera to operate in the foreground and an image captured by the second camera is set as a preview image.

In an embodiment, the processor 401 further executes: performing a blur processing on the preview image captured by the first camera 403 during the activation of the second camera 403.

It should be noted that the electronic equipment provided in these embodiments of the present disclosure share the same concept as the camera control method in above embodiments. Any methods provided in the embodiments of camera control method can be operated on the electronic equipment. Specific procedures for each implementation can be found in the embodiments of the camera control method, which will not be repeated here.

It should be noted that for the camera control method of the embodiments of the present disclosure, ordinary testers in the field can understand that all or part of the process of implementing the camera control method of the embodiments of the present disclosure can be realized by controlling the relevant hardware through a computer program. The computer program may be stored in a computer readable storage medium, such as a storage medium stored in an electronic equipment and is executed by at least one processor in the electronic equipment. The procedure of a camera control method in the embodiments can be included in the execution process. Wherein, the storage medium can be a magnetic disk, an optical disk, a read-only memory, a random-access memory, etc.

For the camera control device of an embodiment of the present disclosure, its functional modules may be integrated into a single processing chip, physically separated for each module, or two or more modules integrated into one module. The above-mentioned integrated modules can be implemented in a form of a hardware, or in a form of a software functional module. If the integrated module is implemented in a form of a software functional module and is sold or used as an independent product, it can also be stored in a computer readable storage medium, such as a read-only memory, a magnetic disk, or an optical disk, etc.

A camera control method, a device, a storage medium, and an electronic equipment are provided in detail in the embodiments of the present disclosure. Specific examples are used in this article to illustrate the principles and implementations of the present disclosure. The description of each embodiment is only used to help understand the method and core idea of the present disclosure. For those skilled in the art, according to the core idea of the present disclosure, there will be variations of specific implementations and scopes of the present disclosure. In summary, the contents in this specification should not be construed as a limitation in the present disclosure.

What is claimed is:

1. A camera control method for an electronic equipment that comprises a plurality of cameras with different focal lengths, the camera control method comprising:
   detecting a change trend of a focus distance of a first camera operating in a foreground when the first camera is operating in a shooting preview mode, wherein an image captured by the first camera is set as a preview image;
   determining a second camera corresponding to the change trend of the focus distance according to a preset correspondence relationship between the change trend of the focus distance and a camera to be determined;
   activating the second camera in the background; and
   switching the second camera to operate in the foreground when a real-time focus distance of the first camera is within a focus distance interval of the second camera, and setting an image captured by the second camera as a preview image, comprising;
   switching the second camera to operate in the foreground and setting the image captured by the second camera as the preview image when the real-time focus distance of the first camera is within the focus distance interval of the second camera.

2. The camera control method of claim 1, wherein the determining the second camera corresponding to the change trend of the focus distance according to the preset corresponding relationship between the change trend of the focus distance and the camera to be determined comprises:
   determining a camera with a focal length larger than the focal length of the first camera as a second camera when the change trend of the focus distance continues to increase within a preset time period; or
   determining a camera with a focal length smaller than the focal length of the first camera as the second camera when the change trend of the focus distance continues to decrease within a preset time period.

3. The camera control method of claim 2, wherein the determining the camera with the focal length larger than the focal length of the first camera as the second camera when the change trend of the focus distance continues to increase within the preset time comprises:
   determining the camera with the smallest focal length from a plurality of cameras whose focal lengths are larger than the focal length of the first camera as the second camera when the change trend of the focus distance continues to increase within the preset time period; and
   wherein the determining the camera with the focal length smaller than the focal length of the first camera as the second camera when the change trend of the focus distance continues to decrease within the preset time period comprises:
   determining the camera with the largest focal length from the plurality of cameras whose focal lengths are smaller than the first camera as the second camera when the change trend of the focus distance continues to decrease within the preset time period.

4. The camera control method of claim 2, wherein after switching the second camera to operate in the foreground, the method further comprises:
   deactivating a third camera when the focal length of the second camera is larger than the focal length of the first camera, and the third camera with the focal length smaller than the first camera is activated in the background; or
   deactivating a fourth camera when the focal length of the second camera is smaller than the first camera, and the fourth camera with a focal length larger than the first camera is activated in the background.

5. The camera control method of claim 1, wherein switching the second camera to operate in the foreground when the real-time focus distance of the first camera is within a focus distance interval of the second camera, and an image captured by the second camera is set as a preview image comprises:

switching the second camera to operate in the foreground and an image captured by the second camera is set as a preview image when an image captured by the second camera overlaps with the content of the preview image captured by the first camera.

6. The camera control method of claim 1, wherein after determining a second camera corresponding to the change trend of the focus distance, the camera control method further comprises:
activating the second camera to operate in the foreground directly when the real-time focus distance of the first camera is within the focus distance interval of the second camera and the second camera is not activated in the background.

7. The camera control method of claim 6, further comprising:
performing a blur processing on the preview image captured by the first camera during an activation of the second camera.

8. The camera control method of claim 7, wherein the performing the blur processing on the preview image captured by the first camera comprises:
performing a Gaussian blur processing on the preview image captured by the first camera.

9. The camera control method of claim 1, wherein the detecting a change trend of the focus distance of the first camera operating in the foreground comprises:
obtaining the focus distances of the first camera at two adjacent time points by sampling at a preset time interval; and
obtaining the change trend of the focus distance according to the relationship between the focus distances at two adjacent time points.

10. A non-transitory computer readable storage medium, configured to store computer program executable by a processor of an electronic equipment comprising a plurality of cameras with different focal lengths to perform operations comprising:
detecting a change trend of a focus distance of a first camera operating in the foreground when the first camera is in a shooting preview mode, and an image captured by the first camera is set as a preview image;
determining a second camera corresponding to the change trend of the focus distance according to a preset correspondence relationship between the change trend of the focus distance and a camera to be determined;
activating the second camera in the background; and
switching the second camera to operate in the foreground when the real-time focus distance of the first camera is within a focus distance interval of the second camera, and an image captured by the second camera is set as a preview image, comprising;
switching the second camera to operate in the foreground and setting the image captured by the second camera as the preview image when the real-time focus distance of the first camera is within the focus distance interval of the second camera.

11. The non-transitory computer readable storage medium of claim 10, wherein the operation of determining a second camera corresponding to the change trend of the focus distance according to a preset corresponding relationship between the change trend of the focus distance and a camera to be determined, comprising:
determining a camera with a focal length larger than the focal length of the first camera as a second camera when the change trend of the focus distance continues to increase within a preset time period; or
determining a camera with a focal length smaller than the focal length of the first camera as a second camera when the change trend of the focus distance continues to decrease within a preset time period.

12. An electronic equipment, comprising:
a plurality of cameras, each camera has a different focal length, and each camera is configured to capture a preview image for preview when it is in a shooting preview mode and is operating in the foreground;
a display screen, configured to display a preview image captured by the camera operating in the foreground;
a storage medium, configured to store a computer program; and
a processor, electrically connected to the plurality of cameras and the display screen, configured to execute the computer program, the execution of the processor comprising:
detecting a change trend of a focus distance of a first camera operating in the foreground when the first camera is in the shooting preview mode, and an image captured by the first camera is set as a preview image;
determining a second camera corresponding to the change trend of the focus distance according to a preset correspondence relationship between the change trend of the focus distance and a camera to be determined;
activating the second camera in the background; and
switching the second camera to operate in the foreground when the real-time focus distance of the first camera is within a focus distance interval of the second camera, and an image captured by the second camera is set as a preview image, comprising;
switching the second camera to operate in the foreground and setting the image captured by the second camera as the preview image when the real-time focus distance of the first camera is within the focus distance interval of the second camera.

13. The electronic equipment of claim 12, wherein determining a second camera corresponding to the change trend of the focus distance according to a preset corresponding relationship between the change trend of the focus distance and a camera to be determined, the execution of the processor comprising:
determining a camera with a focal length larger than the focal length of the first camera as a second camera when the change trend of the focus distance continues to increase within a preset time period; or
determining a camera with a focal length smaller than the focal length of the first camera as a second camera when the change trend of the focus distance continues to decrease within a preset time period.

14. The electronic equipment of claim 13, wherein determining a camera with a focal length larger than the focal length of the first camera as a second camera when the change trend of the focus distance continues to increase within a preset time, the execution of the processor comprising:
determining a camera with the smallest focal length among a plurality of cameras with each of their focal lengths larger than the first camera as a second camera when the change trend of the focus distance continues to increase within a preset time period and there is a plurality of cameras with each of their focal lengths larger than the first camera; and
wherein determining a camera with a focal length smaller than the focal length of the first camera as a second camera when the change trend of the focus distance continues to decrease within a preset time period, the execution of the processor comprising:

determining a camera with the largest focal length among a plurality of cameras with each of their focal lengths smaller than the first camera as a second camera when the change trend of the focus distance continues to decrease within a preset time period and there is a plurality of cameras with each of their focal lengths smaller than the first camera.

15. The electronic equipment of claim 13, wherein after switching the second camera to operate in the foreground, the execution of the processor comprises:

deactivating a third camera when the focal length of the second camera is larger than the focal length of the first camera, and the third camera with a focal length smaller than the first camera is activated in the background; or deactivating a fourth camera when the focal length of the second camera is smaller than the first camera, and the fourth camera with a focal length larger than the first camera is activated in the background.

16. The electronic equipment of claim 12, wherein switching the second camera to operate in the foreground when the real-time focus distance of the first camera is within a focus distance interval of the second camera, and an image captured by the second camera is set as a preview image, the execution of the processor comprises:

switching the second camera to operate in the foreground and an image captured by the second camera is set as a preview image when an image captured by the second camera overlaps with the content of the preview image captured by the first camera.

17. The electronic equipment of claim 12, wherein after determining a second camera corresponding to the change trend of the focus distance, the execution of the processor comprises:

activating the second camera to operate in the foreground directly when the real-time focus distance of the first camera is within a focus distance interval of the second camera and the second camera is not activated in the background.

18. The electronic equipment of claim 17, wherein the execution of the processor further comprises:

performing a blur processing on the preview image captured by the first camera during the activation of the second camera.

19. The electronic equipment of claim 18, performing a blur processing on the preview image captured by the first camera, the execution of the processor comprises:

performing a Gaussian blur processing on the preview image captured by the first camera.

20. The electronic equipment of claim 12, wherein detecting a change trend of the focus distance of the first camera operating in the foreground, the execution of the processor comprises:

obtaining the focus distances of the first camera at two adjacent time points by sampling at a preset time interval; and obtaining the change trend of the focus distance according to the relationship between the focus distances at two adjacent time points.

\* \* \* \* \*